United States Patent Office 3,561,944
Patented Feb. 9, 1971

3,561,944
SOIL TREATING COMPOSITION
John J. Battistoni and William E. Hibbard, Las Vegas, Nev., assignors to Nevada Enzymes, Inc., a corporation of Nevada
No Drawing. Filed Nov. 26, 1968, Ser. No. 779,224
Int. Cl. C05f 5/00
U.S. Cl. 71—26
10 Claims

ABSTRACT OF THE DISCLOSURE

An enzymatic soil enhancing composition comprises water, an enzymatic fermentation reaction product prepared from kelp, cane molasses, raw cane sugar, yeast, malt and a magnesium salt, as well as surfactants, urea and ammonium sulfate.

---

Continuing efforts have sought improved compositions for enhancing the ability of soils to support plant life growth. Most of the compositions have consisted of chemical or natural materials and products which act as fertilizers by supplementing necessary plant nutritional values in which the soil might otherwise be deficient. Fertilizing compositions are especially necessary in rather poorly productive soils which are incumbered by excess alkali or acid conditions, low organic and nutrient contents, high clay contents, poor water retention characteristics, and the like. An effective soil for supporting and sustaining plant growth is, on the other hand, generally high in plant nutrient content. However, a suitable chemical and bacterial balance must also be maintained in order that organic compositions are converted to materials which are readily assimilated by the plants. Where chemical and bacterial imbalance occurs, even though the soil might otherwise be high in potential nutrient value, the lack of necessary bacterial activity will fail to yield the necessary plant nutrients. In addition, the soil must be not too densified or compacted so that moisture and water can readily gain entrance to the soil particles and with little undue physical resistance to root growth. Good water retention characteristics are also necessary. Soils of the Southwest and Western United States as well as other areas are especially poor in these regards since they are high in clay content and are extremely dense, low in plant nutrients, high in alkali content and poor in water penetration. Because of these qualities, mere addition of fertilizers is not sufficient. Even where the clay is covered with desirable soils, unless it is extensively removed below the plant root systems and replaced with easily drained materials, it acts as a water barrier which often results in rot or decay of the plant root systems.

We have now found an enzymatic composition which stimulates bacterial activities within soils and catalyzes the digestion of organic matter present, thereby releasing the necessary natural chemical constituents for plant nutrition. The composition further contains surfactants for improving soil wettability and penetration and enables the breakdown of hard and large soil aggregates to produce finely divided soil particles suitable for healthy plant root growth. The composition also contains a number of useful plant nutrients.

The above as well as other advantages of the composition of the invention will be evident from the following detailed description of the invention.

The active ingredients of the composition of the invention consist of a fermentation reaction product, organic surfactants, urea, and preferably ammonium sulfate. The enzymatic fermentation reaction product due to its composition complexity which is not completely understood will be described herein by its manner of preparation.

The enzymatic composition is prepared by fermenting an aqueous mixture of kelp or other similar and equivalent plant material, molasses, sugar, malt, yeast and a magnesium salt catalyst. These materials are reacted under conditions favorable to the fermentation with the mixture having the following proportions by weight of fermentation reactants:

|  | Percent by weight |
|---|---|
| Kelp | 0.5–5 |
| Molasses | 50–90 |
| Sugar | Up to 40 |
| Malt | 2–10 |
| Yeast | 0.5–5 |
| Magnesium salt | 0.5–5 |

The presence of kelp provides an essential material to the fermentation reaction mixture and the final soil treating product. It is preferred that the kelp be ground or otherwise finely divided so that it is efficiently mixed by agitation with the other fermenting ingredients. Cold processed kelp should be used since process temperatures above about 150° will result in sterilization and permanent inactivation of the enzymatic materials present. Cold processed kelp generally contains between about 10 and about 30% potash (potassium oxide), 1–5% nitrogen, phosphates, organic acids, sugars, a number of trace elements, alkali and alkaline earth metal salts such as chlorides, iodides, sulphates as well as moisture and enzymes. The sugars and enzymes enhance the resulting fermentation reaction product and the potash, calcium and magnesium phosphates, etc. are extremely valuable soil nutrients as is the ammonia produced by decomposition of the nitrogen containing compounds. The enzymatic fermentation further is believed to break down or convert a number of the organic kelp constituents to forms readily assimilated by plants as nutrients. Kelp in amounts of between about 1 and about 5% is preferred.

The molasses used in preparing the fermented mixture is black untreated cane molasses commonly referred to as cane blackstrap molasses or simply, blackstrap. This material is syrupy mother liquor recovered in refining cane sugar from which crystallizable sucrose has been removed. The blackstrap molasses generally contains up to about 50% sucrose in addition to reducing sugars such as glucose and maltose as well as ash, organic non-sugars and some water. The presence of the sugars of the type found in the molasses is important in encouraging the activity of the enzymes and the yeast bacteria by which they are produced. Although the untreated cane blackstrap molasses is preferred other molasses such as beet molasses, barrel molasses and the like may also be used as a natural source of the materials required for the enzymatic fermentation. Preferred concentrations of the molasses are between about 50 and about 75% by weight.

Optimum biological and enzymatic properties of the fermentation reaction product are improved where a portion of the fermentable materials present in the reaction mixture comprises sugar. It has been found that the use of raw sugar, that is the sugar which has not been refined so as to have molasses and other impurities removed yields improved properties as compared to refined sugars. Although the reason for the improvement may not be readily apparent it is believed that the presence of the natural impurities as well as the absence of residual chemicals added during purification in the manufacture of white sugars in some way enhances the activity of the yeast and malt enzymes during fermentation. The amount of sugar present in the fermenting composition may be up to about 40% by weight but is preferably between about 15 and about 30%. It will also be understood that specific amounts of sugar used in obtaining optimum desirable properties will also depend somewhat on the type of molasses added.

Additional essential enzymes present in the composition of the invention are provided by yeast and malt. The specific yeast utilized is that containing bacteria of the family saccharomyces cerevisiae commonly available as baker's yeast. Any form of yeast may be used but it is convenient to add the dry yeast composition whose activity is restored upon mixture with water. A number of enzymes are produced by the active yeast bacteria especially during the fermentation reaction and include both hydrolytic and oxydative enzymes such as invertase, catalase, lactase, maltase, carboxylase and others. It will be appreciated that actual amounts of the various types of enzymes produced will be dependent on a number of factors including the types of molasses and sugar used in preparing the fermentation mixture. However, again it is believed that in utilizing the blackstrap cane molasses and raw cane sugar optimum enzyme yields and activity will be obtained. The amounts of yeast used in the fermentation composition is between about 0.5 and about 5% and preferably between about 1 and about 3%.

Malt provides additional enzymes contributing to the fermentation reaction and the final composition. The specific malt utilized is preferably a diastatic malt which contains a number of enzymes including diastase, maltase and amylase. The malt also is believed to improve the activity of the yeast in addition to contributing to the overall potency and activity of the enzymatic composition within the soil treating product. The amount of malt present may be between about 2 and about 10% and preferably between about 5 and about 10% by weight.

The presence of a small amount of inorganic catalyst such as magnesium salt enhances the activity of the enzymes not only during the fermentation reaction but within the soil. Magnesium sulfate is especially useful for this purpose and small amounts for example between about 0.1 and 5% and preferably between about 0.5 and 3% based on the fermentation reaction mixture may be used.

The fermentation reaction may be conveniently carried out according to the following procedure: The kelp, molasses, sugar and magnesium salt are added to a suitable amount of warm and preferably softened water. Although the specific amount of water used to which the materials are added is not particularly critical it is necessary in order to facilitate easy admixture as well as to activate the yeast and dissolve other solid materials. Suitable amounts of water present are from about 2 to about 20 times the total weight of the active materials used in the fermentation reaction. For example, it may be found convenient to add approximately 50% of the total composition water to the fermentation reaction mixture. The water must meet certain temperature requirements in order to prevent inactivation of the enzymes. Thus, water temperatures greater than about 150° F. must be avoided and preferred temperatures are between about 80 and about 110° F. The use of cold water may also result in unduly slow fermentation reaction rates and thus, should also be avoided. The use of soft water although not critical seems to result in more effective and rapid fermentation reactions as compared to hard water, that is, water containing rather large amounts of calcium. After the kelp, molasses, sugar and magnesium salt have been effectively mixed the malt and the yeast are added, the mixture stirred and allowed to set until fermentation is essentially complete. The reaction time may be between about 2 and about 5 days at temperatures between about 70 and 110° F. Completion may be readily ascertained by noting that the effervescence of the reacting mixture has substantially subsided. Again, it is preferred to allow the mixture to stand at temperatures between about 70 and 110° F. in order that the reaction time will not be unduly prolonged. However, somewhat lower temperatures may be utilized where rapid fermentation times are not especially desired. The fermentation reaction should be allowed to go to substantial completion before combining the reaction product with the surfactants. It has been found that the presence of surfactants during fermentation often inhibits bacterial and enzymatic activity. Amounts of fermentation reaction product between about 20 and about 65% by weight and preferably between about 25 and about 50% by weight based on the active ingredients may be used. Of course it will be appreciated that the specific amounts will depend on the quality of the soil to be treated, crops and desired nutrients.

The surfactants which are to be used are the organic nonionic and anionic surfactants. The anionic surfactants are the non-petroleum derivatives and are readily biodegradable, that is, they may be acted upon by bacteria and reduced to their elemental compositions within the soil. Preferred anionic-type sufactants include sulfates prepared by sulfating vegetable and animal fats and oils and alcohols and their mixtures derived from their reduction or hydrogenation of the vegetable or animal fatty acids. Coconut, palm, tallow, castor, olive, citrus and similar oils are generally used for this purpose. The preferred materials are those containing fatty acids which yield alcohols and alcohol mixtures having between about 8 and about 20 carbon atoms. The sulfates of the alcohols are neutralized with caustic during preparation in yielding the surfactant materials. Other suitable surfactants are those prepared by sulfating olefins which yields secondary alkyl sulfates having between about 8 and about 20 carbon atoms. Additional anionic surfactants include the soaps or alkali metal salts of fatty acids having from 10–18 carbon atoms and mixtures thereof. Salts of palmitic, stearic and oleic acids are useful and mixtures derived from palm and olive oils, lard and tallow are often used. The total amount of anionic-type surfactant may be up to as high as, for example 35% or more by weight based on the total active ingredients (excluding water). Preferred amounts are between about 20 and about 35% by weight. The presence of these anionic surfactants improves the soil wettability of the composition thus enhancing the ability of the enzymes and thus their biological activities in penetrating the aglomerated soil particles. The anionic surfactants also help maintain a suitable ionic balance within the soil.

The other surfactant present is of the nonionic type, which, in addition to contributing to wetting and ionic balance properties has the capacity of enhancing water retention characteristics of the soil and tend to break down clay and other agglomerated soils which are otherwise not easily penetrated by moisture or chemicals. Preferred nonionic surfactants are condensates of ethylene oxide with alkyl phenols, for example, alkyl aryl polyethylene lycols such as alkyl phenyl ethers or polyethylene glycol. These materials are commercially available for example as the Tergitol nonionic surfactants. Polyoxyethylene esters of sorbitan fatty acids or the like may also be used. The amount of the nonionic-type surfactants is preferably between about 20 and about 35% by weight. A surfactant composition of anionic: nonionic between about 1:2 and 2:1 respectively by weight is quite suitable. It has been found that essentially equal parts by weight of both the nonionic and anionic surfactants provide very useful compositions and where the total amount of surfactants is between about 45 and about 60% of the final composition based on the active ingredients.

The presence of urea is important as a source of nitrogen necessary to plant growth. Urea when placed in the soil is acted upon by certain soil bacteria which create the enzyme urease. This enzyme in turn reacts with the urea reducing it to ammonia which is readily assimilated by the plants as nutrient. Further, the presence of ammonia contributes to the overall nitrogen balance of the soil in preserving and maintaining the well known nitrogen cycle essential for plant sustenance. The amount of urea may be varied depending on the requirements of the soils to be treated. Obviously where soils are extremely low in nitrogen contents larger amounts may be used whereas in the case of richer soils lower amounts are acceptable. Suitable amounts are between about 1 and about 10% by weight. Ammonium sulfate is desirable in soils further low in nitrogen and sulfate content. The presence of this material readily yields ammonia and sulfate upon contact with the soil and thus is immediately useable by the plant. Amounts of ammonium sulfate up to about 5% by weight may be used.

The total amount of water present in the product may be varied widely depending on the specific soils intended for treatment and accordingly the desired concentration of active ingredients. Appropriate ratios of water : active ingredients may vary for example between about 2:1 and about 20:1, by weight, it being understood that such a composition is in somewhat concentrated form with further dilution generally required. Dilutions of the concentrate with amounts of water of between 1:100 and 1:5000 by weight respectively are suitable. However, for some applications, it may be desirable to use the concentrate directly or in dilutions for example of up to 1:20 or so followed by further watering the treated soil to further distribute the active ingredients into the soil particles.

The following example illustrates a manner of preparing a composition according to the invention. The example is by way of illustration only and should not be considered as limiting the scope of the invention to any specific materials or proportions set forth.

EXAMPLE

Into a large tank was placed approximately 2,000 gallons of warm softened water. The water temperature was between about 85 and 100° F. To the warm water was added 30 lbs. of vacuum dried ground kelp, 1,320 lbs. of black untreated cane molasses, 400 lbs. raw can sugar and 20 lbs. of magnesium sulfate. The mixture was thoroughly blended by agitation while the temperature of the mixture was maintained. After agitation had achieved an essentially homogeneous mixture, 15 gallons of liquid diastatic malt and 20 lbs. of bakers yeast were added and blended. Thereafter agitation was stopped and the mixture allowed to ferment until the reaction was essentially complete. This was noted by the subsidence of the effervescent reaction which took place in about three days. Thereafter 1,350 lbs. of alkyl phenyl ether of polyethylene glycol (Tergitol nonionic NPX), 1,440 lbs. of sodium tetradecyl sulfate (Tergitol anionic 4), 300 lbs. of granular urea and 200 lbs. of ammonium sulfate were added. Water was then added to bring the volume to about 5,000 gallons after which the mixture again thoroughly agitated.

The composition was found to be non-irritating to skin tissue, nontoxic and could be stored for long periods without discernible loss in effectiveness or deterioration. The product was used for example in amounts of between about 1 gallon per 1,000–3,000 square feet for crop, turf, lawn and general garden plant growing soils with excellent results even in heavy clay soils. The composition was further applied to soils on which all vegetation had recently been destroyed by fire. Prior to treatment the soil was found to be essentially unwettable with water applied standing in beads with heavy run off and early evaporation. Further, where high surface and soil temperatures are caused by such fires, often extensive sterilization of the soil results. Such soils are often essentially useless for sustaining plant growth and especially from seeding for long periods of time until proper chemical and biological conditions are restored. However, upon treatment with the above-described composition, immediate water penetration was achieved as was the restoration of essential plant nutrients, and enzymatic properties whereby plant life could again be sustained. Obviously, such treatment of denuded soils is important in providing otherwise absent conditions for effective seeding and resulting plant propagation. The product may be applied directly to soils, lawns, turf, etc. in concentrated form followed by watering the treated soil, or it may first be diluted with appropriate amounts of water as previously described.

What is claimed is:
1. An aqueous enzymatic soil enhancing composition comprising a major amount of water and a minor amount of a mixture of active ingredients comprising a fermented reaction product of kelp, cane molasses, sugar, malt, yeast and a magnesium salt, surfactants and urea.

2. The composition of claim 1 wherein the reaction product is prepared by fermenting an aqueous mixture of reactants comprising:
between about 0.5 and about 5% kelp;
between about 50 and about 90% blackstrap molasses;
up to about 40% unrefined cane sugar;
between about 2 and about 10% malt;
between about 0.5 and about 5% yeast; and
between about 0.5 and about 5% magnesium salt, said percents being by weight based on the reactants.

3. The composition of claim 2 wherein the reaction product is present in an amount between about 20 and about 65% by weight based on the active ingredients.

4. The composition of claim 1 wherein the yeast comprises saccharomyces cerevisiae.

5. The composition of claim 1 wherein the surfactants are selected from the group consisting of organic anionic and nonionic surfactants and mixtures thereof.

6. The composition of claim 5 wherein the surfactants comprise a mixture of anionic and nonionic surfactants in a ratio of between about 1:2 and about 2:1 by weight, respectively.

7. The composition of claim 1 wherein the surfactants comprise a mixture of an anionic surfactant selected from the group consisting of alkali metal sulfates of alcohols having between about 8 and about 20 carbon atoms and alkali metal salts of fatty acids having between about 10 and about 18 carbon atoms and mixtures thereof, and a nonionic surfactant comprising an alkyl aryl polyethylene glycol and wherein the total amount of surfactants is between about 40 and about 70% by weight based on the total active ingredients.

8. The composition of claim 1 wherein the amount of urea is between about 1 and about 10% by weight and wherein ammonium sulfate is present in amounts between about 0.5 and about 5% by weight based on the total active ingredients.

9. The composition of claim 1 wherein the amount of water is between about 2 and about 20 times by weight of the active ingredients.

10. A method for enhancing plant support characteristics of a soil comprising treating the soil with the composition of claim 1.

References Cited
UNITED STATES PATENTS

| | | | |
|---|---|---|---|
| 1,205,829 | 11/1916 | Wilkening | 71—26X |
| 1,599,185 | 9/1926 | Reich | 71—26 |
| 1,950,701 | 3/1934 | Spangenberg | 71—26X |
| 1,978,201 | 10/1934 | Hever | 71—26X |
| 2,756,134 | 7/1956 | Novak | 71—26X |
| 2,901,864 | 9/1959 | Hiler | 71—26X |
| 3,195,999 | 7/1965 | Chance | 71—26X |

JAMES L. DECESARE, Primary Examiner